US007465872B1

(12) United States Patent
de Rooij et al.

(10) Patent No.: US 7,465,872 B1
(45) Date of Patent: Dec. 16, 2008

(54) PHOTOVOLTAIC POWER CONVERTER SYSTEM WITH A CONTROLLER CONFIGURED TO ACTIVELY COMPENSATE LOAD HARMONICS

(75) Inventors: Michael Andrew de Rooij, Clifton Park, NY (US); Robert Louis Steigerwald, Burnt Hills, NY (US); Eladio Clemente Delgado, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 796 days.

(21) Appl. No.: 10/734,293

(22) Filed: Dec. 15, 2003

(51) Int. Cl.
*H01L 25/00* (2006.01)

(52) U.S. Cl. ........................... 136/243; 363/95; 363/98; 363/906; 307/105; 136/93

(58) Field of Classification Search ................. 136/263, 136/293; 307/31
See application file for complete search history.

(56) References Cited

U.S. PATENT DOCUMENTS

| | | | | |
|---|---|---|---|---|
| 4,404,472 A | | 9/1983 | Steigerwald | |
| 4,424,557 A | * | 1/1984 | Steigerwald | 363/98 |
| 4,445,049 A | | 4/1984 | Steigerwald | |
| 5,397,927 A | * | 3/1995 | Suelzle et al. | 307/105 |
| 5,499,178 A | | 3/1996 | Mohan | |
| 5,568,371 A | | 10/1996 | Pitel et al. | |
| 5,712,774 A | | 1/1998 | Uramoto | |
| 5,726,504 A | | 3/1998 | Pecukonis et al. | |
| 5,929,538 A | * | 7/1999 | O'Sullivan et al. | 307/66 |
| 6,351,400 B1 | | 2/2002 | Lumsden | |
| 6,429,546 B1 | * | 8/2002 | Ropp et al. | 307/31 |

OTHER PUBLICATIONS

D.C. Hopkins and J. Moronski, "Partitioning Digitally Programmable Power-Control for Applications to Ballasts", Conference Proceedings—IEEE Applied Power Electronics Conference and Exposition—APEC, v 2 2002. p. 931-935 (IEEE cat n 02ch37335).*

D.C. Hopkins and J. Moronski, "Partitioning Digitally Programmable Power-Control for Applications to Ballasts", Conference Proceedings—IEEE Applied Power Electronics Conference and Exposition—APEC. v 2 2002. p. 931-935.*

6.8 Active Filters (AFs), *Power electronic control in electrical systems*, pp. 253-259.

Toliyat, Hamid A. et al., *Stator Flux Oriented Control on an Integrated Alternator/Active Filter for Wind Power Applications*, IEEE, copyright 2003, pp. 461-467.

* cited by examiner

*Primary Examiner*—Alexa D Neckel
*Assistant Examiner*—Miriam Berdichevsky
(74) *Attorney, Agent, or Firm*—Ann M. Agosti

(57) ABSTRACT

Photovoltaic power converter system including a controller configured to reduce load harmonics is provided. The system comprises a photovoltaic array and an inverter electrically coupled to the array to generate an output current for energizing a load connected to the inverter and to a mains grid supply voltage. The system further comprises a controller including a first circuit coupled to receive a load current to measure a harmonic current in the load current. The controller includes a second circuit to generate a fundamental reference drawn by the load. The controller further includes a third circuit for combining the measured harmonic current and the fundamental reference to generate a command output signal for generating the output current for energizing the load connected to the inverter. The photovoltaic system may be configured to compensate harmonic currents that may be drawn by the load.

14 Claims, 1 Drawing Sheet

PHOTOVOLTAIC POWER CONVERTER SYSTEM WITH A CONTROLLER CONFIGURED TO ACTIVELY COMPENSATE LOAD HARMONICS

This invention was made with U.S. Government support through Government Contract Number Sandia 55792 awarded by the Department of Energy, and, in accordance with the terms set forth in said contract, the U.S. Government may have certain rights in the invention.

BACKGROUND OF THE INVENTION

The invention relates to a power conversion system, and, more particularly, to a photovoltaic power converter system with a controller configured to actively compensate harmonics that may be drawn by a load coupled to the photovoltaic system.

Environmental concerns and the search for alternative sources to generate electrical energy suitable for supplying households or small commercial sites have driven the need for power converter systems, such as photovoltaic array converters that can process sunlight into a standard and usable electrical form, e.g., supplying energy to the mains grid during daylight hours.

It is known that many of these photovoltaic array converters simply inject a unity power factor sinusoidal current onto the mains grid supply thereby reducing the total energy drawn by the local load from the mains grid supply. Loads on the local grid can draw currents, which may contain harmonics. These harmonic currents can potentially disturb the mains grid supply and other loads on the system. For example, these harmonic currents may lead to poor utilization of the grid supply and can cause voltage distortions and, in severe cases, cause other loads on the same supply to malfunction.

Some power electronic systems may be designed not to draw harmonic currents and are referred to as low Total Harmonic Distortion (THD) unity power factor converters. However, not all loads draw unity power factor with a low THD and it is for these loads that compensation is needed. The number of the loads that can generate harmonic currents may further aggravate the problem. Large active power compensators installed by power utilities are sometimes used on the mains grid supply to reduce the harmonic currents that are present on the system and various main nodes. These large and bulky systems unfortunately are limited in the number of the harmonics that can be compensated for, are expensive and generally do not reduce the harmonic currents at all points on the mains grid.

BRIEF DESCRIPTION OF THE INVENTION

One aspect of the invention provides a photovoltaic power converter system, such as may comprise a photovoltaic array, and an inverter electrically coupled to the array to generate an output current for energizing a load connected to the inverter and to a mains grid supply voltage. The photovoltaic power converter system may further comprise a controller including a first circuit coupled to receive a load current to measure a harmonic current in the load current. The controller includes a second circuit to generate a fundamental reference drawn by the load. The controller further includes a third circuit for combining the measured harmonic current and the fundamental reference to generate a command output signal for generating the output current for energizing the load connected to the inverter.

The features and advantages of the present invention will become apparent from the following detailed description of the invention when read with the accompanying drawings.

DETAILED DESCRIPTION OF THE INVENTION

The inventors of the present invention have innovatively recognized a power conversion system, such as a photovoltaic array in combination with an inverter, that not only supplies electrical energy to a load, such as a standard household, but also may be configured to compensate for local load harmonic currents that may be drawn. Local load systems may comprise every load on a local mains grid, such that a single breaker can disconnect the local grid from a mains supply grid, such as the main circuit breaker in a household. The photovoltaic system may be suitable for households, office, warehouse or commercial site and may operate in a grid tied mode.

Figure 1:
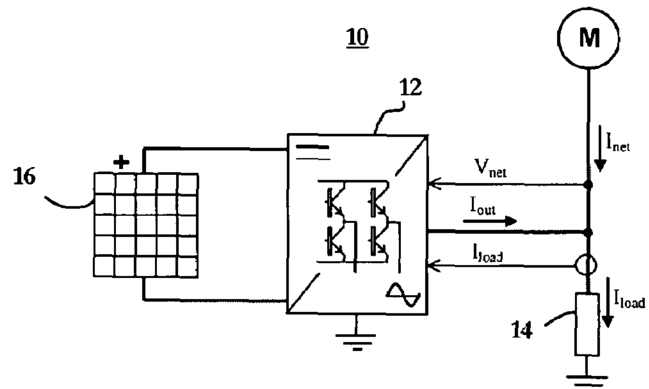
FIG. 1 is a block diagram of a photovoltaic power converter system constructed in accordance with an exemplary embodiment of the invention.

FIG. 1 is a block diagram of an exemplary embodiment of an active compensator photovoltaic converter system 10. The converter system 10 may include an inverter 12 coupled to a load 14 and a photovoltaic array 16 operating as a power source. The details of the inverter are not particularly relevant for purposes of the present invention. For readers desirous of such details in connection with one exemplary inverter architecture reference is made to U.S. patent application Ser. No. 10/329,906, filed Dec. 26, 2002, assigned in common to the same assignee of the present invention and herein incorporated by reference in its entirety.

The operation of a standard photovoltaic converter system can be mathematically described by equations 1 through 3 below. The mains grid voltage may be a standard sinusoidal time varying voltage at a fundamental frequency, usually 50 Hz or 60 Hz with an amplitude of V volts.

$$V_{net}(t)=V\cdot\sin(\omega\cdot t) \qquad (1)$$

where:

$V_{net}$(t)=Mains grid supply voltage [V]

V=Amplitude of the mains grid supply voltage [V]

ω=Mains grid supply frequency [$s^{-1}$]

t=Time [s]

The available photovoltaic array power may be used to determine the amplitude of the current that will be injected into the mains grid supply-load system. The amplitude of this current is given in equation 2 and the time varying form is given in equation 3.

$$I_a=\frac{P_{array}}{V} \qquad (2)$$

where:

$P_{array}$=The available power from the photovoltaic array [W]

$I_a$=Amplitude of the injected current [A]

$$I_{out}(t)=I_a\cdot\sin(\omega\cdot t) \qquad (3)$$

where:

$I_{out}(t)$=Injected current [A]

In one exemplary embodiment, the active compensator photovoltaic converter system is configured so that the harmonic current content of the load is measured and is subtractively injected together with the active power current into the mains grid supply-load system. The result is that if the photovoltaic array is able to supply sufficient power, the current in the mains grid will have just a fundamental component.

Equations 4 and 5 may be used to illustrate the mathematical basis for the harmonic compensation.

$$I_h(t)=I_{load\text{-}1}(t)-I_{load}(t) \quad (4)$$

where:

$I_h(t)$=Harmonic current of the load [A]

$I_{load\text{-}1}(t)$=Fundamental current drawn by the load [A]

$I_{load}(t)$=Load current [A]

$$I_{out}(t)=I_a\cdot\sin(\omega\cdot t)+I_h(t) \quad (5)$$

Figure 2:
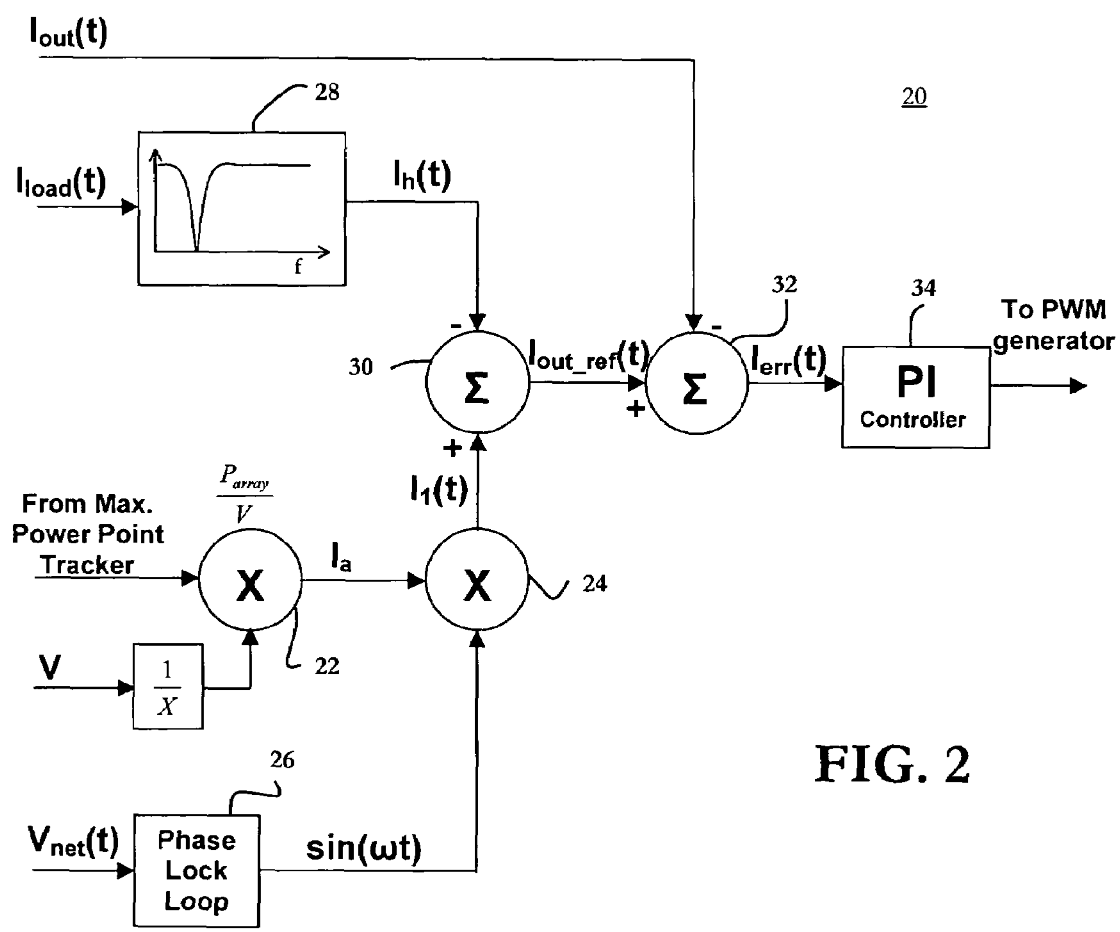
FIG. 2 is a block diagram of a controller providing active compensation to the photovoltaic power converter system of FIG. 1.

FIG. 2 is a block diagram of one exemplary controller 20 for the active compensator photovoltaic converter system of FIG. 1. The diagram shows one example of how the above-identified mathematical relationships can be implemented. It will be appreciated that if the load current ($I_{load}(t)$) measurement is omitted, then the system would revert to that of a standard photovoltaic converter controller.

At a multiplier 22, the controller 20 receives a maximum power point reference (e.g., available array power, $P_{array}$), such as may be obtained from a standard maximum power tracker. Multiplier 22 allows multiplying $P_{array}$ with the inverse (e.g., 1/V) of the mains grid voltage amplitude (V) to determine the amplitude of the injectable current ($I_a$). This current reference is mixed at a mixer 24 with a sinusoidal waveform that is phase locked with the mains grid voltage by a phase lock loop 26 to generate the actual fundamental sinusoidal current reference ($I_1(t)$). The load harmonic current ($I_h(t)$) may be determined by measuring the load current ($I_{load}(t)$) and filtering out with a notch filter 28 the fundamental component. The fundamental current reference $I_1(t)$ and the inverse (e.g., opposite polarity achieved by sign inversion) of the harmonic current reference $I_h(t)$ are then summed together at a summer 30 to produce a current reference ($_{Iout\_ref}(t)$) for the system. This current reference is then processed using standard feedback techniques to control the actual output current of the system ($I_{out}(t)$). For example, an error signal ($I_{err}(t)$ that comprises the difference between ($_{Iout\_ref}(t)$) and ($I_{out}(t)$) as may be obtained in a summer 32 may be processed by a proportional plus integral (PI) controller 34 in turn coupled to a pulse width modulator (not shown) using standard pulse width modulation techniques to generate the switching signals for actuating the switching gates of the inverter. It will be appreciated from the mathematical relationships and the controller diagram that measurement of the mains grid current into the system is not a requirement. For example, processing just the local load current to extract the harmonic content would allow performing the desired compensation. That is, this harmonic compensation may be conveniently and effectively achieved through a relatively minor modification to a standard power converter system.

In operation, a photovoltaic power converter system may include a photovoltaic array 16 (FIG. 1). The converter system may further include an inverter 12 electrically coupled to the array 16 to generate an output current $I_{out}(t)$ for energizing a load 14 connected to the inverter 14 and to a mains grid supply voltage $V_{net}(t)$. In one exemplary embodiment, a controller 20 (FIG. 2) includes a first circuit, such as a notch filter 28, coupled to receive a load current $I_{load}(t)$ to measure a harmonic current $I_h(t)$ in the load current. The controller includes a second circuit to generate a fundamental reference $I_1(t)$ drawn by the load. The second circuit may comprise the mixer 24 that receives a sinusoid from the phase lock loop 26 and the signal indicative of the magnitude of injectable current ($I_a$) available from the photovoltaic array for generating the fundamental reference. The controller may further include a third circuit, such as a summer 30, for combining the measured harmonic current and the fundamental reference to generate a command or reference output signal ($_{Iout\_ref}(t)$ for generating the output current $I_{out}(t)$ for energizing the load connected to the inverter.

Aspects of the invention can be embodied in the form of computer-implemented processes and apparatus for practicing those processes. Aspects of the invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Aspects of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules. Other embodiments may be a micro-controller, such as a dedicated micro-controller, a Field Programmable Gate Array (FPGA) device, or Application Specific Integrated Circuit (ASIC) device.

While the preferred embodiments of the invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed as new and desired to be protected by Letters Patent of the United States is:

1. A photovoltaic power converter system comprising:

a photovoltaic array;

an inverter electrically coupled to said photovoltaic array to inject an output current to a mains grid supply voltage; and a controller including a first circuit coupled to receive a load current and separate out a harmonic component from the load current to measure a load harmonic current; a second circuit for determining an amplitude of an injectable current available from the photovoltaic array to generate a fundamental sinusoidal current reference that is phased locked with the mains grid supply voltage; and a third circuit for combining the load harmonic current and the fundamental sinusoidal current reference to generate a command output signal, wherein the controller is configured to generate an error signal based on a difference between the command output signal and the output current, and wherein the controller is configured to process the error signal and to generate a switching signal for actuating a switching gate of said inverter to compensate for the load harmonic current when said inverter injects the output current to the mains grid supply voltage.

2. The photovoltaic power converter system of claim 1, wherein said first circuit comprises a notch filter configured to pass harmonics present in said load current.

3. The photovoltaic power converter system of claim 1, wherein said second circuit comprises a phase lock loop coupled to receive said supply voltage and generate a sinusoid corresponding to the frequency of said supply voltage.

4. The photovoltaic power converter system of claim 3, wherein said second circuit further comprises a mixer configured to receive said sinusoid and a signal indicative of the magnitude of current available from the photovoltaic array for generating said fundamental reference.

5. The photovoltaic power converter system of claim 1, wherein said controller is selected from the group consisting of a micro-controller, a Field Programmable Gate Array device and an Application Specific Integrated Circuit device.

6. A controller for a photovoltaic power converter system including a photovoltaic array coupled to an inverter to generate an output current for energizing a load connected to said inverter, said controller comprising:

a first circuit coupled to receive a load current and separate out a harmonic component from the load current and to measure a harmonic current;

a second circuit for determining an amplitude of an injectable current available from the photovoltaic array to generate a fundamental sinusoidal current reference that is phased locked with a mains grid supply voltage; and a third circuit for combining the load harmonic current and the fundamental sinusoidal current reference to generate a command output signal, wherein the controller is configured to generate an error signal based on a difference between the command output signal and the output current, and wherein the controller is configured to process the error signal and to generate a switching signal for actuating a switching gate of said inverter to compensate for the load harmonic current when said inverter injects the output current to the mains grid supply voltage.

7. The controller of claim 6, wherein said first circuit comprises a notch filter configured to pass harmonics present in said load current.

8. The controller of claim 6, wherein said second circuit comprises a phase lock loop coupled to receive a supply voltage and generate a sinusoid corresponding to a frequency of said supply voltage.

9. The controller of claim 8, wherein said second circuit further comprises a mixer configured to receive said sinusoid and a signal indicative of the magnitude of current available from the photovoltaic array for generating the fundamental reference drawn by said load.

10. The controller of claim 6, selected from the group consisting of a micro-controller, a Field Programmable Gate Array device, and an Application Specific Integrated Circuit device.

11. A method for controlling a photovoltaic power converter system including a photovoltaic array coupled to an inverter to generate an output current for energizing a load connected to said inverter, said method comprising:

receiving a load current to separate out a harmonic component from the load current and to measure a load harmonic current;

determining an amplitude of an injectable current available from the photovoltaic array and generating a fundamental sinusoidal current reference that is phase locked with the mains grid supply voltage; and combining the load harmonic current and the fundamental sinusoidal current reference to generate a command output signal, whereby the controller is configured to generate an error signal based on a difference between the command output signal and the output current, and whereby the controller is configured to process the error signal and to generate a switching signal for actuating a switching gate of said inverter to compensate for the load harmonic current when said inverter injects the output current to the mains grid supply voltage.

12. The method of claim 11, wherein the receiving of the load current comprises processing said load current to pass harmonics present in said load current.

13. The method of claim 11, wherein said generating of a fundamental reference comprises receiving a supply voltage to generate a sinusoid corresponding to a frequency of said supply voltage.

14. The method of claim 13, wherein said generating of a fundamental reference further comprises mixing said sinusoid and a signal indicative of the magnitude of current available from the photovoltaic array for generating the fundamental reference drawn by said load.

* * * * *